(12) United States Patent
Allen et al.

(10) Patent No.: US 9,373,086 B1
(45) Date of Patent: Jun. 21, 2016

(54) CROWDSOURCE REASONING PROCESS TO FACILITATE QUESTION ANSWERING

(71) Applicant: International Business Machines Corporation, Armonk, NY (US)

(72) Inventors: Corville O. Allen, Morrisville, NC (US); Scott A. Will, Louisburg, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/591,051

(22) Filed: Jan. 7, 2015

(51) Int. Cl.
*G06F 17/30* (2006.01)
*G06N 5/04* (2006.01)

(52) U.S. Cl.
CPC ............ *G06N 5/046* (2013.01); *G06F 17/3043* (2013.01)

(58) Field of Classification Search
CPC ....................................................... G06N 3/04
USPC ............................................................ 706/46
See application file for complete search history.

(56) References Cited

U.S. PATENT DOCUMENTS

| | | | |
|---|---|---|---|
| 8,340,955 B2 | 12/2012 | Brown et al. | |
| 8,560,567 B2 | 10/2013 | Azzam et al. | |
| 8,701,019 B2 | 4/2014 | Baldwin et al. | |
| 8,726,169 B2 | 5/2014 | Payne et al. | |
| 8,732,204 B2 | 5/2014 | Chua et al. | |
| 8,738,617 B2 | 5/2014 | Brown et al. | |
| 8,769,417 B1 | 7/2014 | Robinson et al. | |
| 8,805,756 B2 | 8/2014 | Boss et al. | |
| 8,812,982 B2 | 8/2014 | Ross et al. | |
| 8,819,007 B2 | 8/2014 | Brown et al. | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0072947 A1* | 3/2014 | Boguraev | G09B 7/00 434/362 |
| 2014/0279996 A1 | 9/2014 | Teevan et al. | |
| 2014/0297754 A1 | 10/2014 | Ross et al. | |

OTHER PUBLICATIONS

Bruno, Nicholas V. et al., "Natural Language Processing Utilizing Logical Tree Structures", filed Oct. 6, 2014, U.S. Appl. No. 14/506,855.

(Continued)

*Primary Examiner* — Stanley K Hill
*Assistant Examiner* — Ola Olude Afolabi
(74) *Attorney, Agent, or Firm* — Stephen J. Walder, Jr.; Diana R. Gerhardt

(57) ABSTRACT

Mechanisms are provided, in association with a Question and Answer (QA) system, for implementing corpus identified reasoning when evaluating questions. An input question is received and an answer to the input question and supporting evidence for the answer are determined based on an evaluation of a corpus of information. The supporting evidence is analyzed to identify reasoning criteria specifying a reason as to why the answer is considered to be a correct answer by a provider of the supporting evidence. Rules are generated based on the identified reasoning criteria with the rules correlating the answer with the identified reasoning criteria and features of the input question. The rules are stored as entries in a reasoning data structure a subsequent question is processed based on the reasoning data structure.

19 Claims, 6 Drawing Sheets

(56) References Cited

OTHER PUBLICATIONS

Bruno, Nicholas V. et al., "Natural Language Processing Utilizing Transaction Based Knowledge Representation", filed Oct. 6, 2014, U.S. Appl. No. 14/506,898.
High, Rob, "The Era of Cognitive Systems: An Inside Look at IBM Watson and How it Works", IBM Corporation, Redbooks, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Yuan, Michael J., "Watson and healthcare, How natural language processing and semantic search could revolutionize clinical decision support", IBM developerWorks, IBM Corporation, Apr. 12, 2011, 14 pages.

* cited by examiner

CROWDSOURCE REASONING PROCESS TO FACILITATE QUESTION ANSWERING

BACKGROUND

The present application relates generally to an improved data processing apparatus and method and more specifically to mechanisms for using crowdsourcing to identify reasoning processes and implement those reasoning processes to facilitate question answer for subsequent questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and the Watson™ system available from International Business Machines (IBM®) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system having a processor and a memory and which implements a Question and Answer (QA) system is provided. The method comprises receiving, by the QA system, an input question and determining, by the QA system, an answer to the input question and supporting evidence for the answer based on an evaluation of a corpus of information. The method further comprises analyzing, by the QA system, the supporting evidence to identify reasoning criteria specifying a reason as to why the answer is considered to be a correct answer by a provider of the supporting evidence. Moreover, the method comprises generating, by the QA system, one or more rules based on the identified reasoning criteria. The one or more rules correlate the answer with the identified reasoning criteria and one or more features of the input question. In addition, the method comprises storing, by the QA system, the one or more rules as one or more entries in a reasoning data structure and processing, by the QA system, a subsequent question based on the reasoning data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
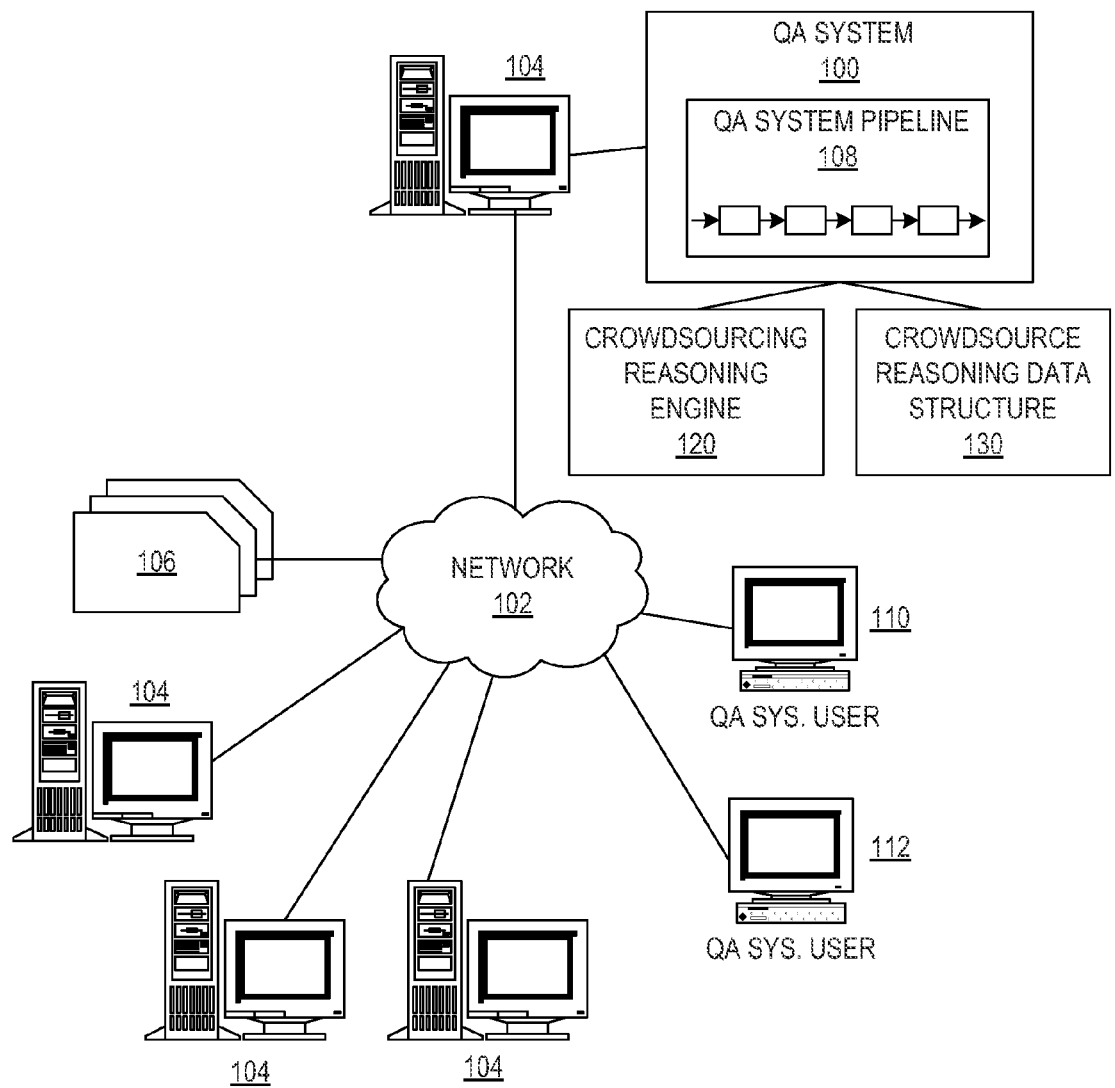
FIG. 1 depicts a schematic diagram of one illustrative embodiment of a question/answer creation (QA) system in a computer network.

The illustrative embodiments provide mechanisms for using crowdsourcing to identify an answer to a question in a crowdsource source, and corresponding reasoning processes used by the user(s) providing the answer to the question, and then implementing the reasoning process as logic for answering future similar questions. When a subsequent similar question is processed, the criteria set forth in the reasoning process (now implemented as logic in the question answering system) are evaluated to determine if a same answer applies to this subsequent question. In this way, user based reasoning processes may be automatically identified from crowdsource sources and used to generate logic for evaluating subsequent questions.

It should be appreciated that the term "crowdsource" or "crowdsourcing" refers to the process of obtaining needed services, ideas, or content by soliciting contributions from a large group of people, and especially from an online community, rather than from traditional individual suppliers or users. Crowdsourcing combines the efforts of numerous users where each contributor, of their own initiative, adds a small portion to the greater result. While numerous users may provide the content or contributions, this content or contributions are often compiled by a single web site, online community, or the like, which represents a crowdsource or crowdsourcing source. The contributions provided by the contributors may be provided in many different ways including blog entries, instant messaging session messages, chat session logs, posts to websites, or any other source of information that represents a textual exchange of messages between users of a website, electronic messaging service, or other online community.

With the mechanisms of the illustrative embodiments, one or more crowdsourcing sources are including in one or more corpora upon which a Question and Answer (QA) system, such as the IBM Watson™ QA system available from International Business Machines (IBM) Corporation of Armonk, N.Y., operates to generate answers to submitted questions. As such, the contributions from the contributors, such as users of the web site, members of the online community, or the like (hereafter referred to simply as "users"), are used as a basis for analysis to identify an answer to a question submitted to the QA system for processing. In analyzing the crowdsourcing source, the textual statements or other textual content provided by the crowdsourcing source are parsed and evaluated to generate a logical parse tree or knowledge graph. The logical parse tree or knowledge graph is then evaluated to identify key reasoning phrases or terms indicative of a reasoning statement for a corresponding answer, e.g., reasoning terms or phrases such as "because", "due to", "on account of", etc taking into account synonyms or other equivalent terms/phrases, in nodes of the logical parse tree or knowledge graph. Reasoning criteria specified in association with the reasoning terms/phrases are identified and used to generate a distribution of reasoning criteria indicative of reasoning for the answer to the particular question. Based on this distribution, reasoning criteria that are most often identified by users or evidence in the crowdsourcing source's content, and/or across users of multiple crowdsourcing sources, as indicative of a particular answer to the question may be selected for use in generating rules/logic associated with the answer and the question characteristics.

Answer reasoning rules/logic corresponding to the reasoning criteria are then generated and stored in association with the question characteristics, or features, extracted by the QA system when processing the question and the answer. This correlation of question characteristics with answer reasoning rules/logic is stored in a data structure associated with the QA system. The answer reasoning rules/logic may be searched by the QA system to determine if there is an entry having matching question characteristics, or question characteristics that meet a predetermined level of similarity, to the characteristics of a question being processed. If such a match is identified, then the corresponding answer reasoning rules/logic may be applied to evidence extracted from the corpus corresponding to the focus of the question being processed. If the evidence extracted from the corpus indicates that the answer reasoning rules/logic is satisfied, i.e. the criteria specified in the answer reasoning rules/logic are met or exceeded by the extracted evidence, then the corresponding answer may be returned, even if the answer is not explicitly found in the corpus or corpora itself.

Alternatively, rather than generating rules/logic for evaluating reasoning criteria when processing subsequent similar questions, in some illustrative embodiments, additional statements or content may be generated, and added to the corpus, that specifically sets forth the reasoning as to the criteria for supporting an answer using generic terms that allow the criteria to be applied to subsequent question processing. The statements added to the corpus in this manner may be such that they associate the reasoning criteria with question characteristics and the answer. Thus, the corpus itself may be modified to add explicit statements of the reasoning process for corresponding answers in such a way that the statements may be used as evidence or content of the corpus used to generate candidate answers to subsequent questions.

Thus, the mechanisms of the illustrative embodiments provide a way of identifying the reasons given by users for answers to questions in crowdsource information. The mechanisms of the illustrative embodiments are especially well suited to situations where the answer to a question is a subjective qualitative answer. For example, if a user submits the input question "Is Austin a nice place to live?" this is a qualitative determination and thus, one user may have a different opinion than another as to whether Austin is a nice place to live. Regardless, however, the users may submit, through reasoning statements, the criteria they are using to support their corresponding answer. Thus, one user may state that Austin is nice place to live because it has good schools, low crime, and good weather conditions. Another user may state that Austin is not a nice place to live because traffic conditions are bad. Regardless, one can determine from these statements that the criteria used by users to evaluate whether a place is a good place to live or not is whether it has good schools, whether it has low crime, whether it has good weather conditions, and whether it has bad traffic conditions. Each of these may be associated with different ultimate answers, e.g., bad traffic conditions=not nice place to live and good schools, low crime, and good weather=nice place to live.

As discussed above, each of the statements made by users in the crowdsourcing source(s) may be evaluated to generate a distribution of the reasoning criteria used by these users to provide their corresponding answers to thereby select the most often used criteria for providing underlying reasoning as to the answers generated and to generate a corresponding rule/logic/corpus statement specifying this reasoning criteria in association with a corresponding answer and question characteristics. For example, if the question is "Is Austin a nice place to live?" and the rules/logic generated as a result of evaluating the crowdsourcing source content indicates that a city is a nice place to live if it has good schools, low crime, and good weather conditions, then if the evidence from the corpus indicates that Austin has good schools, low crime, and good weather conditions, then by applying the rules/logic, the answer of "Yes, Austin is a nice place to live" may be generated. This answer may be appended with the reasoning as to why the answer was generated, e.g., "because it has good schools, low crime, and good weather conditions."

Moreover, it can be appreciated that the same rationale specified in the rules/logic/corpus statement may be applied to other similar input questions. For example, after having identified the reasoning rules/logic above, i.e. a city is nice to live in if it has good schools, low crime, and good weather conditions, a user may ask the question "Is NYC nice?" Evidence from the corpus may be evaluated to identify characteristics of NYC (the focus of the subsequent question) as having good schools, but possibly not low crime and not good weather conditions. In such a case, the answer may be that NYC is not a nice place to live. However, in some situations perfect matches are not necessary and as long as a predetermined amount of the criteria, or a score generated based on evaluating the criteria, is met or exceeded, then the corresponding answer may be output. In some illustrative embodiments, based on the number of users providing the various criteria via the crowdsourcing sources, as determined from the distribution generated, various weights may be associated with the different criteria, e.g., those criteria most often used will have higher weights than criteria that are used less often. The weights may be used to evaluate and generate a score for the matching of the characteristics of the focus of the subsequent question to the reasoning criteria. Thus, if good schools were much more heavily weighted than low crime and good weather conditions, even though NYC may not match these other criteria, NYC may still be considered a "good place to live" because it has good schools.

It should be appreciated that while the primary illustrative embodiments will be described in terms of using crowdsourcing sources as a basis for identifying the user provided reasoning behind an answer to a question, the illustrative embodiments are not limited to such. To the contrary, the mechanisms of the illustrative embodiments may be applied to any corpus of information in which the reasoning for providing a particular answer to a question is explicitly stated in the corpus and can be identified and used to generate logic having criteria for evaluating similar subsequent questions in the manner described herein. In fact, in some illustrative embodiments, creators for content to be provided in a corpus for a QA system may specifically formulate the content such that reasoning for answers in the content are explicitly stated in the content itself or metadata associated with the content such that it may be evaluated in accordance with the illustrative embodiments. Thus, crowdsourcing sources are not necessary to the illustrative embodiments but have been identified as a reliable source of information for identifying the reasoning behind answers to questions.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
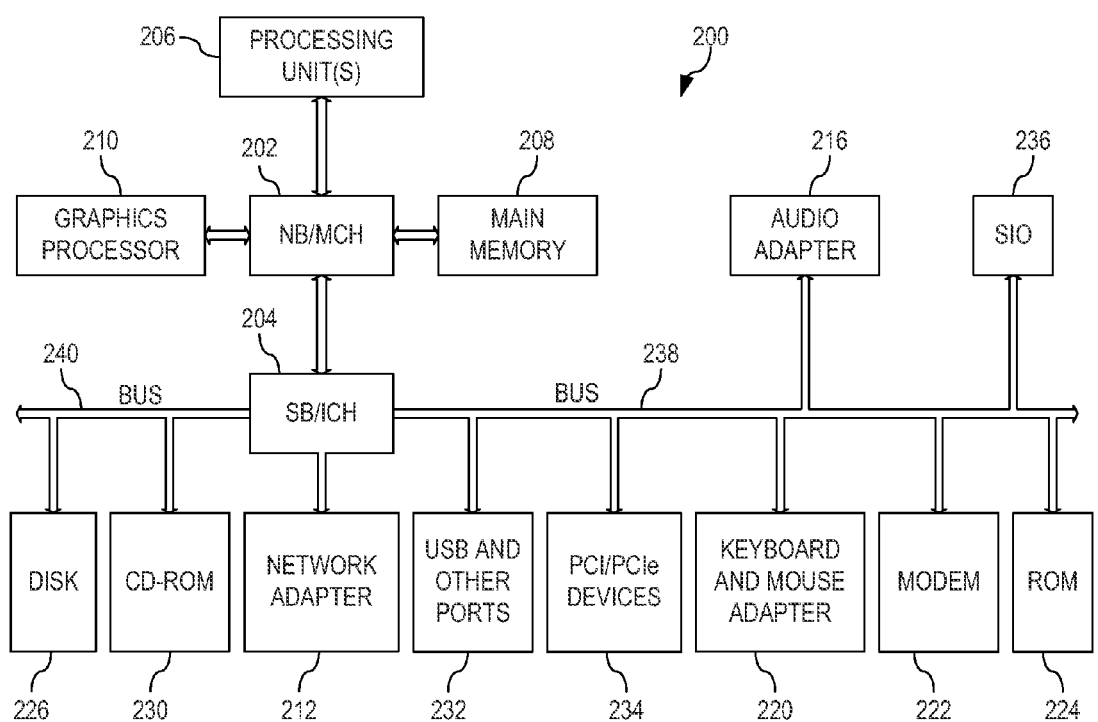
FIG. 2 is a block diagram of an example data processing system in which aspects of the illustrative embodiments are implemented.
Figure 3:
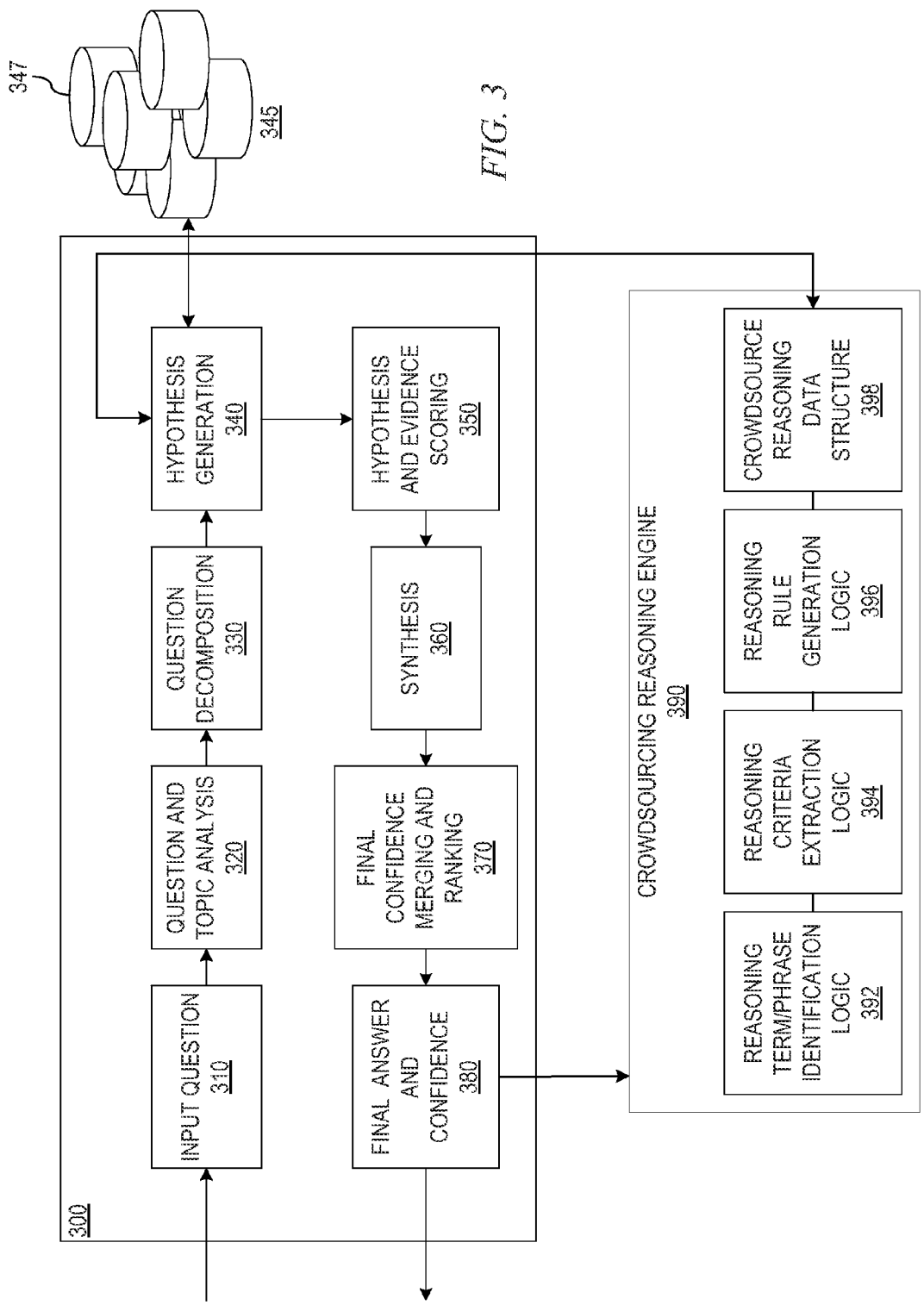
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to identifying reasoning for answers that may be utilized to establish rules/logic/corpus statements for evaluation of subsequently submitted questions of a similar nature.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify the question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with the mechanisms of the illustrative embodiments, a crowdsourcing reasoning engine 120 is provided that evaluates answers to questions obtained from the corpus to identify textual statements within the corpus associated with the answer or evidence in support of the answer to identify key reasoning terms and phrases indicative of reasoning criteria used to provide the reason why the particular contributor (user) that submitted the content believes the answer to be correct. For example, assume that a portion of the corpus comprises a social networking website in which users may converse with one another through textual message exchanges and one user asks the online community, comprising the users of the website or a subset of the users of the website (e.g., particular group within the online community), whether Austin is a nice place to live by submitting the question "Is Austin a nice place to live?". Another user may reply with a message "Yes, because it has good schools, low crime, and good weather conditions." From this exchange, it can be determined by the crowdsourcing reasoning identification engine 120 that the answer is "Yes" for the question having question characteristics of "Austin", "nice", "place", and "live", and that the reasoning criteria are "good schools", "low crime", and "good weather conditions."

This correlation of information with the answer and question characteristics may be used by the crowdsourcing reasoning engine 120 to generate one or more rules/logic or corpus statements that implement the reasoning for future similar questions. Thus, for example, in this case, a rule of the type "If a city has good schools, low crime, and good weather conditions, then it is a nice place to live." Of course, synonyms for terms used in the rule may also be matched, e.g., "good" with "nice" and other synonyms, "low" with "minimum", "negligible", or other synonyms, and the like. The resulting rules/logic or corpus statements may then be used to evaluate subsequently submitted questions either by applying the rules/logic to evidence obtained from the corpus for the question to match reasoning criteria or using the corpus statements as content/evidence like other content/evidence in the corpus for evaluating questions.

As another example, assume that a user submits a question to an online community of the type "Why is NYC nice?" and another user responds with "Because it is clean, they pay teachers well, which attracts better teachers, which leads to better schools." Through a decomposition of the question it can be determined that the answer is implied in the question "why", i.e. the answer is "NYC is nice." The reasoning term that is recognized in the statement is the term "because" and reasoning criteria associated with the reasoning term "because" includes the city being clean, the teachers being paid well, and better schools. In addition, it can be identified by the logic of the crowdsourcing reasoning engine 120 that the term "which" represents a result that is generated by the previous phrase which may lead to an additional set of correlated criteria including that if teachers are paid well, better teachers are attracted, and if better teachers are attracted, then the city has better schools. Thus, a series of corpus statements and/or rules/logic may be generated of the type "Good teachers lead to good schools", "Paying teachers well attracts good teachers" and "a city that is clean, has good teachers, and has good schools is nice."

It should be noted that for simplicity, the above examples, and other examples provided hereafter, operate on a single set of question and user answer text statements to illustrate the operation of the illustrative embodiments. However, as noted above, in actuality, in some illustrative embodiments the evaluation of the reasoning criteria is performed across multiple users providing answers to questions in the crowdsourcing source and/or across multiple users across multiple crowdsourcing sources. Thus, a distribution of the reasoning criteria used by users in answering the posed question is generated and the most frequently occurring criteria are selected and utilized. Corresponding weightings may be assigned to the different reasoning criteria based on the frequency of users utilizing that reasoning criteria in the distribution. In some illustrative embodiments, rather than selecting criteria, all criteria may be utilized with corresponding weightings being used to effectively elevate or eliminate certain reasoning criteria from use.

The crowdsourcing reasoning engine 120 may generate a crowdsource reasoning data structure 130 that specifies the correlation of question characteristics with reasoning rules/logic and corresponding answers. The crowdsource reasoning data structure 130 may be searched by the QA system pipeline 108 while processing an input question to determine if characteristics of the input question substantially match the question characteristics of an entry in the crowdsource reasoning data structure 130 in which case the reasoning rules/logic of the corresponding entry are evaluated to determine if a corresponding answer should be returned. If so, then the answer may be returned to the user who submitted the input question along with the reasoning why the answer is correct, e.g., "Austin is a nice place to live because it is clean, has good teachers, and has good schools." Thus, the reasoning provided by crowdsourcing sources may be implemented when answering subsequent questions of a similar nature.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms is synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

The above description illustrates the general operation of a QA system pipeline 300 when processing an input question to generate a final answer that is then returned and presented to the source of the original input question. The illustrative embodiments improve upon this general operation by further providing mechanisms for identifying and applying crowdsourcing reasoning to the evaluation of questions and generation of corresponding answers. Thus, in accordance with the illustrative embodiments, in addition to the other elements of the QA system pipeline 300 discussed above, a crowdsourcing reasoning engine 390 is provided.

As shown in FIG. 3, the crowdsourcing reasoning engine 390 comprises reasoning term/phrase identification logic 392, reasoning criteria extraction logic 394, reasoning rule generation logic 396, and a crowdsource reasoning data structure 398. The reasoning term/phrase identification logic 392 operates to identify key terms/phrases that are recognized as indicative of a reasoning criteria being provided for an answer. As such, the reasoning term/phrase identification logic 392 may comprise a database or key reasoning terms/phrases that are indicative of reasoning criteria being provided. That is, in response to the identification of a final answer to the input question through the processing of the QA system pipeline 300, the evidential statements supporting the final answer and/or portion of content in which the final answer is found in the corpus are analyzed to determine if any of the recognizable key reasoning terms/phrases in the database are present in the evidential statements and/or portion of content.

In analyzing the crowdsourcing source, the textual statements or other textual content provided by the crowdsourcing source are parsed and evaluated to generate a logical parse tree or knowledge graph. The logical parse tree or knowledge graph is then evaluated to identify key reasoning phrases or terms indicative of a reasoning for a corresponding answer, e.g., reasoning terms or phrases such as "because", "due to", "on account of", etc taking into account synonyms or other equivalent terms/phrases. An example of a mechanism for generating such a logical parse tree or knowledge graph is described in co-pending and commonly assigned U.S. patent application Ser. No. 14/506,855, entitled "Natural Language Processing Utilizing Logical Tree Structures," filed Oct. 6, 2014, which is hereby incorporated herein by reference. Another example of a mechanism for generating a knowledge graph based on a logical parse which may be used with the mechanisms of the illustrative embodiments is described in co-pending and commonly assigned U.S. patent application Ser. No. 14/506,898, entitled "Natural Language Processing Utilizing Transaction Based Knowledge Representation," filed Oct. 6, 2014, which is hereby incorporated herein by reference.

For those evidential statements and/or portions of content in which the recognizable reasoning term/phrase is found, analysis is performed by the reasoning criteria extraction logic 394 to identify the reasoning criteria associated with the final answer. The reasoning criteria extraction logic 394 performs natural language processing operations on the evidential statements and/or portions of content to identify phrases specifying reasoning criteria. In order to perform such operations, the logical parse tree or knowledge graph of the evidential statements that was generated is analyzed to identify the reasoning criteria. This analysis may involve identifying sub-trees within the logical parse tree that correspond to the identified recognizable key reasoning terms/phrases and analyzing the nodes of the sub-tree to extract nodes having properties indicative of criteria.

To further explain the operation of the logical parse tree or knowledge graph in the operation of the illustrative embodiments, it should be appreciated that the logical parse tree/knowledge graph breaks down and separates fact or statement elements and attaches logical operations for each element. There is a conclusion that can be drawn based on the logical operations that would enable a statement/element to be true or pass based on the element's sub nodes. For each element in the parent node, the text is parsed to find similar terms and verbs used in a node to identify a candidate node based on the input question, e.g., by finding synonyms to objects, ontological equivalent objects (e.g., cities—New York and Austin are ontological equivalent cities), or objects with similar characteristics (e.g., baseball and football are both games and both use round balls).

The illustrative embodiments find all the sub-nodes that enable the parent node to be given a true or pass result, factoring in the logical operators, such as "AND" and "OR," to determine the set of nodes required to make an element pass rather than fail. The set of reasoning criteria are the nodes that enable the parent node to pass or become true. Consider the example of a parent node "good schools in city" which has AND sub nodes "be high scores" and "small classes", including OR sub nodes "pay teachers well". The reasoning nodes from different crowd sourced content attached to the same question type, can then be matched to answer question on "good schools in Austin", by finding reasoning that talks about "high scores" on tests in Austin and they keep "small classes". Although the occurrence of good schools in Austin is never found in the corpora, the reasoning nodes for "good schools in city" will pass based on the Austin having high scores on tests and small classes.

The operation by the reasoning criteria extraction logic 394 may be performed on multiple evidence statements and/or portions of content provided by the same or multiple different users via the same or multiple different crowdsourcing sources. Thus the reasoning criteria extraction logic 394 may build a distribution of reasoning criteria found by the reasoning criteria extraction logic along with a count for each reasoning criteria as to the number of times a user mentions the reasoning criteria as a basis for the answer that they provide. For example, if 10 users all provided evidence statements associated with answering the question "Is Austin a nice place to live?" and 7 of them used good schools as a criterion, 10 used low crime as a criterion, 4 used low taxes as a criterion, 8 used parks/recreation as a criterion, 5 used traffic as a criterion, and 1 used state capital as a criterion, then this distribution can be analyzed to identify the most often occurring criteria for selection as criteria for use in generating reasoning rules. For example, a threshold may be established that identifies a subset of the criteria to be selected for use in generating reasoning rules. Alternatively, all or a subset of the most frequently used criteria may be used to generate rules with associated weightings associated with the criteria based on their values in the distribution, e.g., a criterion having 7 users using that criterion would have a heavier weight than a criterion having only 2 users using that criterion for providing an answer to the question. The reasoning criteria extraction logic 394, depending on the manner in which it is configured, identifies the criteria in the logical parse of the evidential statements, generates a distribution, and selects the most frequently occurring criteria and/or associates weights with the criteria based on the distribution.

The selected criteria and/or weights are provided to the reasoning rule generation logic 396 which generates the reasoning rules based on the selected criteria and/or weights. The reasoning rules correlate the selected criteria with the question characteristics obtained from analysis of the input question, and the ultimate final answer. The reasoning rules preferably are applicable to more generalized question characteristics, e.g., focus types and the like. Thus, for example, a reasoning rule may be of the type that "if a city (question focus) has good schools (criteria 1) and low crime (criteria 2), then it is a nice place to live (answer)." Moreover, the criteria in the rule may have associated weight values, such that for example good schools may have a 0.6 weight while low crime has a 0.4 weight. A threshold value may be established for determining whether the result of evaluating the criteria for a particular set of evidence for a subsequent question meets a level to warrant return of the answer as a result, e.g., if it is determined from the evidence that the particular city has low crime, but not good schools, then the weighted value may be 0.4 and if a threshold is 0.5, then the answer of the city being a good place to live is not returned since the minimum threshold of 0.5 is not met.

The reasoning rules generated by reasoning rule generation logic 396 are stored in the crowdsource reasoning data structure 398. Entries in the crowdsource reasoning data structure 398 correlate the question characteristics with the corresponding answer and the reasoning rule generated by the reasoning rule generation logic 396. The QA system pipeline 300, such as part of the hypothesis generation stage 340, the QA system pipeline 300 may access the entries of the crowdsource reasoning data structure 398 to determine if there is any entries in the crowdsource reasoning data structure 398 whose question characteristics match one or more of the question characteristics of the current input question 310 identified by stages 320 and 330. For those matching entries, the evidence obtained from the corpus 347 or corpora 345 may be evaluated to determine if the criteria of the reasoning rules of the matching entries are met, or if weighted values calculated based on the criteria meet or exceed a predetermined threshold. For those entries whose reasoning rules criteria are met, the corresponding answer may be returned as a final answer to the input question. In some illustrative embodiments, the criteria met may also be returned so that it may be included in the final answer that is returned. For example, if the criteria indicates that the city has both good schools and low crime, then the final answer may not only be "yes, <city> is a nice place to live", but also may include the phrase "because it has good schools and low crime."

It should be noted that the illustrative embodiment described above with regard to FIG. 3 assumes that reasoning rules (or logic) are generated for the reasoning criteria identified in association with the answer to the question. However, in other illustrative embodiments, rather than generating rules/logic for evaluating reasoning criteria when processing subsequent similar questions, in some illustrative embodiments, additional statements or content may be generated, and added to the corpus, that specifically sets forth the reasoning as to the criteria for supporting an answer using generic terms that allow the criteria to be applied to subsequent question processing. The statements added to the corpus in this manner may be such that they associate the reasoning criteria with question characteristics and the answer. Thus, the corpus itself may be modified to add explicit statements of the reasoning process for corresponding answers in such a way that the statements may be used as evidence or content of the corpus used to generate candidate answers to subsequent questions.

For example, if it is determined that the reasoning for determining that a city is a nice place to live comprises whether or not the city has good schools, low crime, and low taxes, then a statement of the type "A city is a nice place to live if it has good schools, low crime, and low taxes" may be generated and added to the corpus 347 or corpora 345. Thus, when a subsequent input question 310 is received, this statement in the corpus 347 or corpora 345 may be used as an evidential statement for generating support for candidate answers. Thus, the mechanisms of the illustrative embodiments provide a way of identifying the reasons given by users for answers to questions in crowdsource information.

Figure 4:
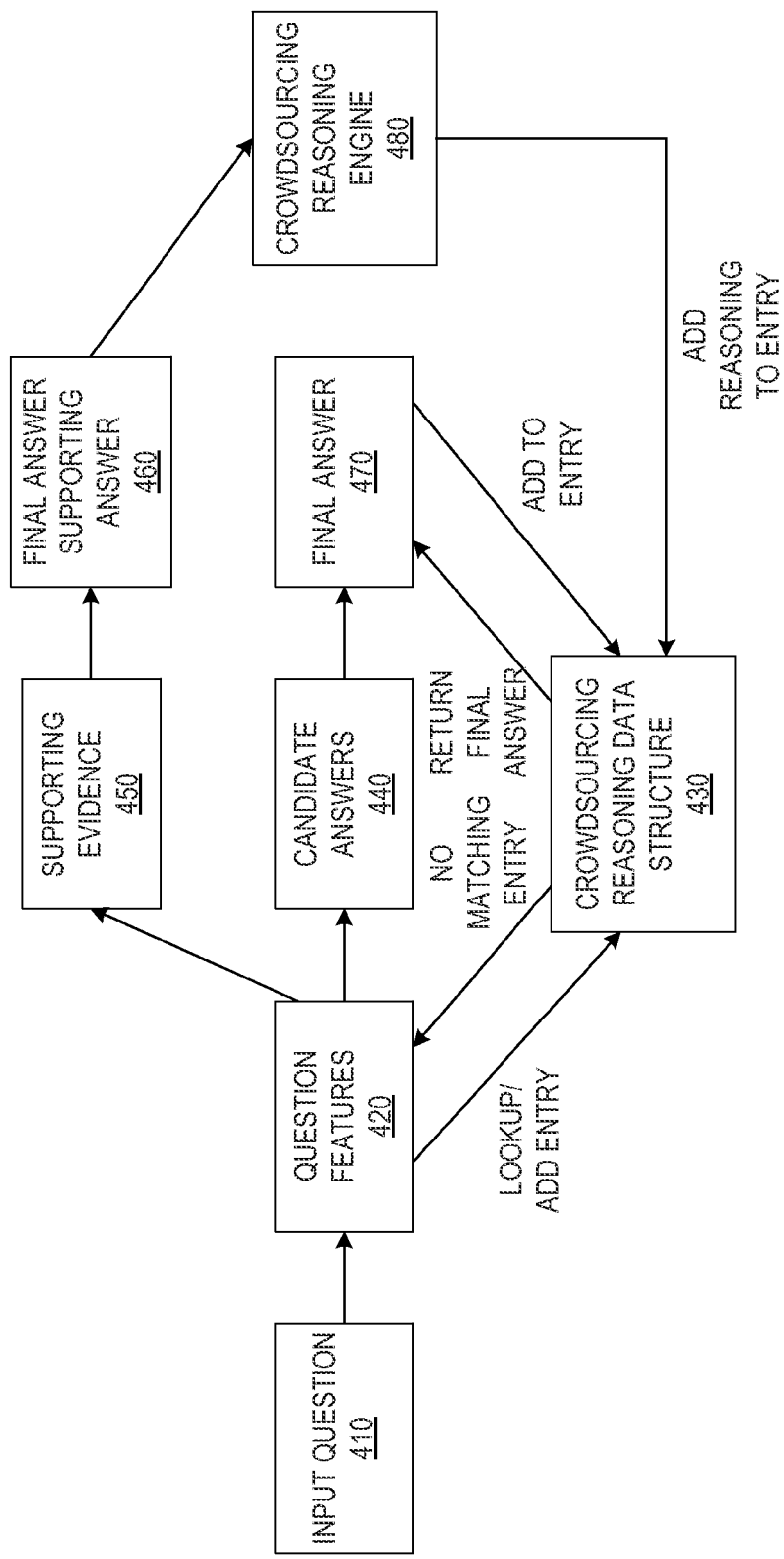
FIG. 4 is an example block diagram illustrating an operation of a crowdsourcing reasoning engine in accordance with one illustrative embodiment.

FIG. 4 is an example block diagram illustrating an operation of a crowdsourcing reasoning engine in accordance with one illustrative embodiment. As shown in FIG. 4, initially an input question 410 is received by the QA system pipeline and analyzed to extract question characteristics or features 420. The characteristics or feature 420 are used to perform a lookup operation in a crowdsourcing reasoning data structure 430 to determine if there is an entry having the same or substantially similar (within a predetermined tolerance) question characteristics or features. In identifying the same or similar question characteristics or features, synonyms and other equivalent terms/phrases data structures may be used to identify same or similar question characteristics.

If a sufficiently similar entry is not found in the crowdsourcing reasoning data structure 430, then the question processing by the QA system pipeline may continue such that queries are generated, applied to the corpus or corpora, and candidate answers 440 and supporting evidence 450 are generated/retrieved. The candidate answers 440 and supporting evidence 450 are scored and evaluated to identify a final answer 470 and its corresponding supporting evidence 460. The supporting evidence 460 for the final answer 470 may be provided to the crowdsourcing reasoning engine 480 which identifies the reasoning criteria for the selection of the final answer 470. As noted above, this may involve the generation of logical parse trees, analysis of the logical parse trees to identify recognizable key reasoning terms/phrases, and identifying sub-trees and nodes associated with these identified recognizable key reasoning terms/phrases that are indicative of reasoning criteria. Moreover, this identification of reasoning criteria may further include the generation of a distribution of reasoning criteria to select the most frequently occurring reasoning criteria, generation of weighting values, and the like, as discussed above. The resulting reasoning criteria are then used to generate rules, logic, and/or statements to be added to the corpus, that codify or apply the reasoning criteria for use in evaluating the evidence of subsequent similar questions to determine if a similar final answer 470 should be output. The resulting reasoning rules/logic, and in some illustrative embodiments the weights associated with the various criteria in the reasoning rules/logic, may be stored in the crowdsourcing reasoning data structure 430 along with the final answer 470 and question characteristics/features 420 such that these are correlated with one another.

Going back to the initial extraction of question characteristics/features 420 from the input question 410, and the lookup of these question characteristics/features 420 in the crowdsourcing reasoning data structure 430, if there is a match identified, the processing of the input question 410 by the QA system pipeline may be circumvented by having the corresponding final answer specified in the matching entry returned as the final answer 470. This avoids much of the operation of the QA system pipeline with regard to processing the candidate answers, generating candidate answer confidence scores, ranking, selection of the final answer, and the like. Thus, if a matching entry is identified, the evidence 450 generated by applying the queries to the corpus or corpora may be evaluated to determine if the criteria within the corresponding rules for the matching entries are met. If so, the corresponding final answer may be output as the final answer 470. If not, then the processing by the QA system pipeline may continue in a normal fashion as described above.

It should be noted that when performing the lookup operation in the crowdsourcing reasoning data structure 430, there may be multiple entries that correspond to the same question characteristics/features 420. For example, assume that there is a set of rules of the type:

(1) A city is a nice place to live if the crime is low.
(2) A city is a nice place to live if it has parks.
(3) A city is a nice place to live if it has good schools.
(4) A city is a nice place to live if it has low taxes, good roads, and good traffic conditions.

In such a situation, various mechanisms may be employed to obtain a consensus of results of the evaluation of these various rules to generate a final answer. For example, a majority vote may be utilized where each rule is evaluate and the majority result of the rules is used to determine whether the corresponding answer should be returned as the final answer for the input question 410. For example, if a majority of the rules result in a positive outcome, then the corresponding answer will be returned as a final answer; otherwise, the corresponding answer is not returned as a final answer. Of course other mechanisms may be utilized including various weighted evaluations of the different rules, various calculations that may be generated based on the evaluation of the criteria of the various rules, and the like.

Figure 5:
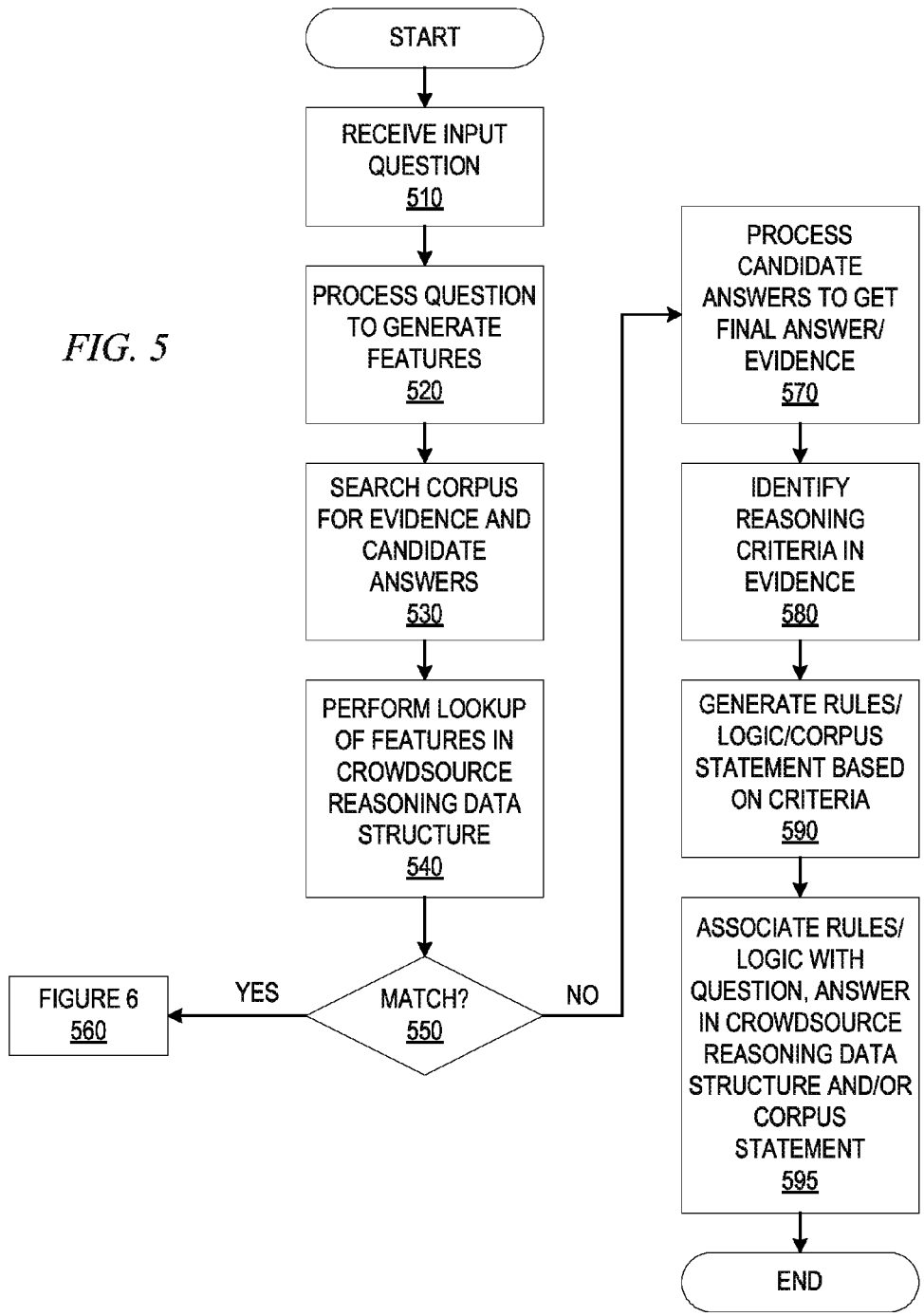
FIG. 5 is a flowchart outlining an example operation of a crowdsourcing reasoning engine when generating a crowdsourcing reasoning rule in accordance with one illustrative embodiment.

FIG. 5 is a flowchart outlining an example operation of a crowdsourcing reasoning engine when generating a crowdsourcing reasoning rule in accordance with one illustrative embodiment. The operation outlined in FIG. 5 may be performed, for example, by a QA system implementing crowdsourcing reasoning engine in accordance with one or more of the illustrative embodiments described above.

As shown in FIG. 5, the operation starts with receipt of an input question for processing (step 510). The question is processed to extract or generate question characteristics/features (step 520) which are then used to generate queries for searching the corpus for candidate answers to the input question and corresponding supporting evidence passages from the corpus (step 530). In addition, the question characteristics/features are used as a basis for performing a search of a crowdsourcing reasoning data structure for one or more matching entries having similar question characteristics/features (step 540). It should be appreciated that the operations set forth in steps 530 and 540 may in fact be performed in parallel rather than sequentially as shown in FIG. 5.

A determination is made as to whether one or more matching entries in the crowdsourcing reasoning data structure are found by the search (step 550). If so, the operation continues on to the process shown in FIG. 6 and described hereafter (step 560). If no matching entries are found in the crowdsourcing reasoning data structure, then the candidate answers and corresponding evidence are processed in a normal fashion by the QA system pipeline to generate a final answer for the input question (step 570). The supporting evidence for the final answer generated in this manner is then processed by the crowdsourcing reasoning engine to identify recognizable key reasoning terms/phrases and then the corresponding reasoning criteria within the supporting evidence (step 580). Based on the identified reasoning criteria, one or more rules/logic/corpus statements are generated (step 590). The rules/logic are then stored in association with the question characteristics/features and final answer in the crowdsourcing reasoning data structure and/or the corpus statement is added to the corpus (step 595). The operation then terminates.

It should be noted that FIG. 5 shows the creation of entries in the crowdsourcing reasoning data structure being performed in response to no matching entries being found. Alternatively, periodically, the mechanisms of the illustrative embodiments may re-initialize the crowdsourcing reasoning data structure such that previously stored entries are invalidated and the crowdsourcing reasoning data structure may be re-built so as to take into consideration the most recent crowdsourcing information regarding the input questions. In some illustrative embodiments, entries in the crowdsourcing reasoning data structure may have associated timestamps and once an entry is a predetermined age, it may be invalidated so as to renew the entry through the processes of FIG. 5. Other events may also be utilized to trigger the operation in FIG. 5 without departing from the spirit and scope of the illustrative embodiments.

Figure 6:
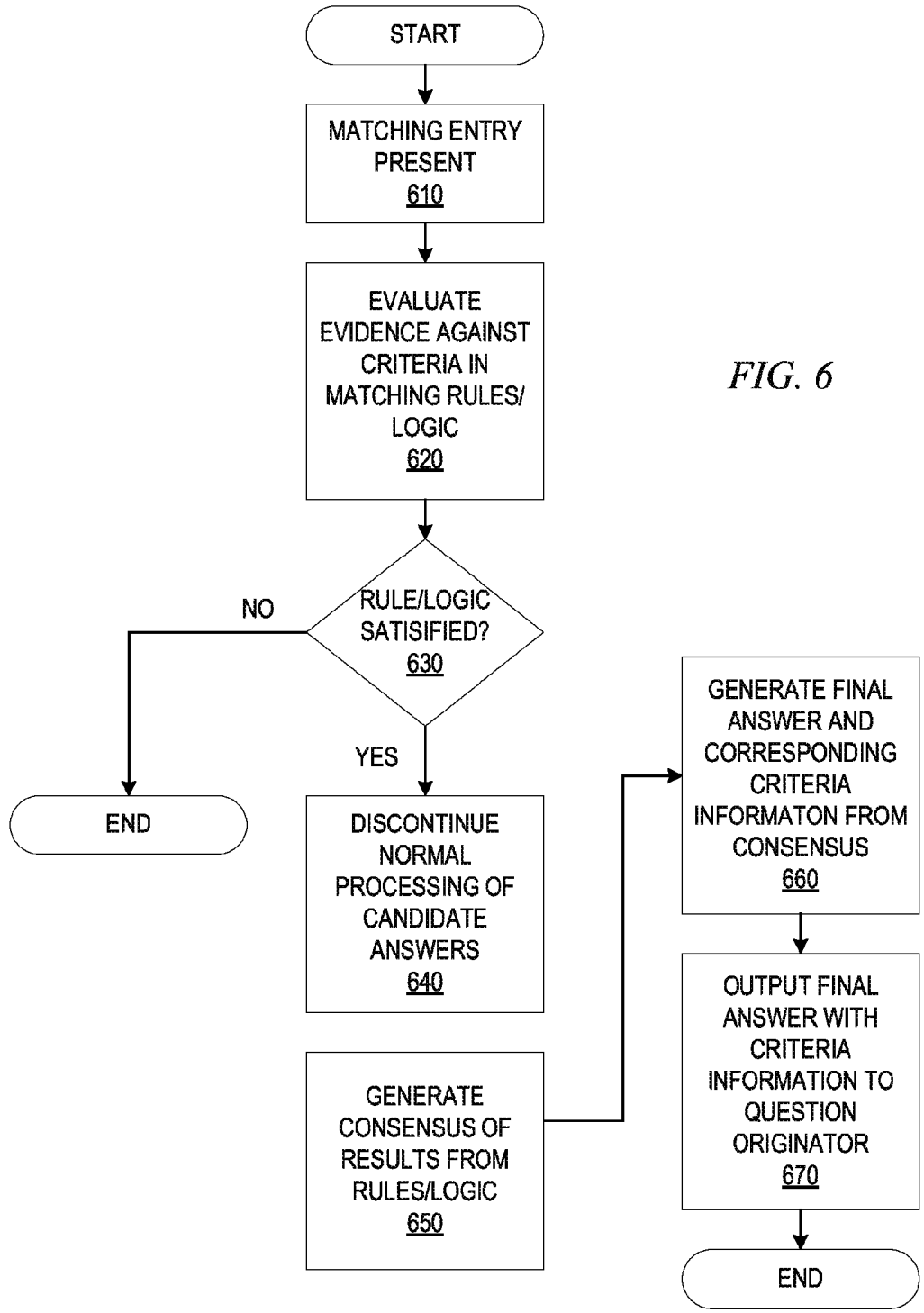
FIG. 6 is a flowchart outlining an example operation of a QA system pipeline when determining if an input question corresponds to a crowdsource reasoning data structure entry in accordance with one illustrative embodiment.

FIG. 6 is a flowchart outlining an example operation of a QA system pipeline when determining if an input question corresponds to a crowdsourcing reasoning data structure entry in accordance with one illustrative embodiment. As shown in FIG. 6, the operation starts with a determination that there is one or more matching entries in the crowdsourcing reasoning data structure (step 610). This may be due to the result of the operation in step 550 of FIG. 5, for example.

The evidence passages identified in the corpus for the input question are evaluated against the criteria set forth in the rules/logic of the one or more matching entries (step 620). A determination is made as to whether the criterion of one or more of the rules/logic of the entries is satisfied (step 630). If not, terminates and returns to step 570 with essentially a determination that the candidate answers for the input question need to be processed normally. If the criteria of one or more of the rules/logic of the entries is satisfied, then normal processing of candidate answers for the input question by the QA system pipeline is discontinued (step 640) and a consensus of the results of the rules/logic is generated (step 650). The consensus is evaluated to determine and generate a final answer to be returned to the QA system pipeline with the corresponding criteria information providing support for the final answer (step 660). The final answer is then output by the QA system pipeline as the final answer to the input question along with the criteria information specifying the reasoning behind the final answer (step 670). The operation then terminates.

Thus, the illustrative embodiments provide mechanisms for identifying the reasons given by users, or other sources of answers to questions, for the answers to questions, such as may be provided in crowdsource information. As noted above, the mechanisms of the illustrative embodiments are especially well suited to situations where the answer to a question is a subjective qualitative answer rather than a quantitative or more explicit fact based answer. The mechanisms of the illustrative embodiments may evaluate the collective reasoning of an online community when determining how to implement such reasoning to new sets of evidence for new input questions. Thus, the QA system is able to adapt to the collective consciousness of the online community, especially when evaluating qualitative based questions, thereby giving the QA system the ability to generate answers that are more likely to be in-line with the reasoning the question submitter is likely to use when generating answers to such questions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory and which implements a Question and Answer (QA) system, the method comprising:
   receiving, by the QA system, an input question;
   analyzing, by the QA system, the input question to extract one or more semantic or syntactic features of the input question;
   determining, by the QA system, an answer to the input question and supporting evidence for the answer based on an evaluation of a corpus of information;
   analyzing, by the QA system, natural language content of the supporting evidence to identify reasoning key words or reasoning key phrases and associated reasoning criteria, present in the natural language content of the supporting evidence, the reasoning criteria specifying a reason as to why the answer is considered to be a correct answer by a provider of the supporting evidence;
   generating, by the QA system, one or more rules based on the identified reasoning criteria, wherein the one or more rules correlate the answer with the identified reasoning criteria and the one or more semantic or syntactic features of the input question;
   storing, by the QA system, the one or more rules as one or more entries in a reasoning data structure; and
   processing, by the QA system, a subsequent question based on the reasoning data structure.

2. The method of claim 1, wherein the corpus of information comprises natural language crowdsource information and wherein the provider of the supporting evidence is a crowdsourcing source.

3. The method of claim 1, wherein analyzing the natural language content of the supporting evidence to identify reasoning key words or reasoning key phrases and associated reasoning criteria comprises performing a search of text of the supporting evidence for reasoning key terms or reasoning key phrases indicative of a natural language reasoning statement in the text of the supporting evidence linking at least one reasoning criterion to the answer.

4. The method of claim 3, wherein performing a search of the text of the supporting evidence comprises generating a logical parse tree and evaluating nodes of the logical parse tree to determine which nodes of the logical parse tree comprise the reasoning key terms or reasoning key phrases indicative of a natural language reasoning statement.

5. The method of claim 3, wherein analyzing the natural language content of the supporting evidence to identify reasoning key words or reasoning key phrases and associated reasoning criteria further comprises, for each instance of a reasoning key term or reasoning key phrase found in the text of the supporting evidence:
   identifying reasoning criteria specified in association with the reasoning key term or reasoning key phrase; and
   generating a distribution of reasoning criteria indicative of reasoning for the answer to the input question.

6. The method of claim 5, wherein generating one or more rules based on the identified reasoning criteria comprises:
   selecting, based on the distribution of reasoning criteria, one or more reasoning criteria that are most often identified in association with the answer to the input question; and
   generating the one or more rules based on the selected one or more reasoning criteria.

7. The method of claim 1, wherein processing the subsequent question based on the reasoning data structure comprises:
   searching the reasoning data structure based on features of the subsequent question to identify a matching entry in the reasoning data structure having one or more semantic or syntactic features similar to the features of the subsequent question;
   retrieving a rule associated with the matching entry; and
   applying the rule to evidence identified in the corpus of information corresponding to a focus of the subsequent question to determine if the identified reasoning criteria of the rule are satisfied by the evidence identified in the corpus of information corresponding to the focus of the subsequent question.

8. The method of claim 7, wherein processing the subsequent question based on the reasoning data structure further comprises:
   in response to the rule being satisfied, returning an answer corresponding to the matching entry as an answer to the subsequent question; and
   in response to the rule not being satisfied, processing the subsequent question by the QA system to generate another answer to the subsequent question.

9. The method of claim 1, further comprising, in response to generating one or more rules:
   generating one or more additional natural language statements specifying reasoning of the one or more rules in association with the answer; and
   inserting the one or more additional natural language statements into the corpus of information.

10. A computer program product comprising a non-transitory computer readable medium having a computer readable program stored therein, wherein the computer readable program, when executed on a data processing system implementing a Question and Answer (QA) system, causes the data processing system to:
   receive, by the QA system, an input question;
   analyze, by the QA system, the input question to extract one or more semantic or syntactic features of the input question;
   determine, by the QA system, an answer to the input question and supporting evidence for the answer based on an evaluation of a corpus of information;
   analyze, by the QA system, natural language content of the supporting evidence to identify reasoning key words or reasoning key phrases and associated reasoning criteria, present in the natural language content of the supporting evidence, the reasoning criteria specifying a reason as to why the answer is considered to be a correct answer by a provider of the supporting evidence;
   generate, by the QA system, one or more rules based on the identified reasoning criteria, wherein the one or more rules correlate the answer with the identified reasoning criteria and the one or more semantic or syntactic features of the input question;
   store, by the QA system, the one or more rules as one or more entries in a reasoning data structure; and
   process, by the QA system, a subsequent question based on the reasoning data structure.

11. The computer program product of claim 10, wherein the corpus of information comprises natural language crowdsource information and wherein the provider of the supporting evidence is a crowdsourcing source.

12. The computer program product of claim 10, wherein the computer readable program further causes the data processing system to analyze the natural language content of the supporting evidence to identify reasoning key words or reasoning key phrases and associated reasoning criteria at least by performing a search of text of the supporting evidence for reasoning key terms or reasoning key phrases indicative of a natural language reasoning statement in the text of the supporting evidence linking at least one reasoning criterion to the answer.

13. The computer program product of claim 12, wherein the computer readable program further causes the data processing system to perform a search of the text of the supporting evidence at least by generating a logical parse tree and evaluating nodes of the logical parse tree to determine which nodes of the logical parse tree comprise the reasoning key terms or reasoning key phrases indicative of a natural language reasoning statement.

14. The computer program product of claim 12, wherein the computer readable program further causes the data processing system to analyze the natural language content of the supporting evidence to identify reasoning key words or reasoning key phrases and associated reasoning criteria further at least by, for each instance of a reasoning key term or reasoning key phrase found in the text of the supporting evidence:
   identifying reasoning criteria specified in association with the reasoning key term or reasoning key phrase; and
   generating a distribution of reasoning criteria indicative of reasoning for the answer to the input question.

15. The computer program product of claim 14, wherein the computer readable program further causes the data processing system to generate one or more rules based on the identified reasoning criteria at least by:

selecting, based on the distribution of reasoning criteria, one or more reasoning criteria that are most often identified in association with the answer to the input question; and generating the one or more rules based on the selected one or more reasoning criteria.

16. The computer program product of claim 10, wherein the computer readable program further causes the data processing system to process the subsequent question based on the reasoning data structure at least by:

searching the reasoning data structure based on features of the subsequent question to identify a matching entry in the reasoning data structure having one or more semantic or syntactic features similar to the features of the subsequent question;

retrieving a rule associated with the matching entry; and applying the rule to evidence identified in the corpus of information corresponding to a focus of the subsequent question to determine if the identified reasoning criteria of the rule are satisfied by the evidence identified in the corpus of information corresponding to the focus of the subsequent question.

17. The computer program product of claim 16, wherein the computer readable program further causes the data processing system to process the subsequent question based on the reasoning data structure at least by:

in response to the rule being satisfied, returning an answer corresponding to the matching entry as an answer to the subsequent question; and in response to the rule not being satisfied, processing the subsequent question by the QA system to generate another answer to the subsequent question.

18. The computer program product of claim 10, wherein the computer readable program further causes the data processing system to, in response to generating one or more rules:

generate one or more additional natural language statements specifying reasoning of the one or more rules in association with the answer; and insert the one or more additional natural language statements into the corpus of information.

19. An apparatus comprising:

a processor; and a memory coupled to the processor, wherein the memory comprises instructions which, when executed by the processor, cause the processor to:

receive an input question;

analyze the input question to extract one or more semantic or syntactic features of the input question;

determine an answer to the input question and supporting evidence for the answer based on an evaluation of a corpus of information;

analyze natural language content of the supporting evidence to identify reasoning key words or reasoning key phrases and associated reasoning criteria, present in the natural language content of the supporting evidence, the reasoning criteria specifying a reason as to why the answer is considered to be a correct answer by a provider of the supporting evidence;

generate one or more rules based on the identified reasoning criteria, wherein the one or more rules correlate the answer with the identified reasoning criteria and the one or more semantic or syntactic features of the input question;

store the one or more rules as one or more entries in a reasoning data structure; and process a subsequent question based on the reasoning data structure.

* * * * *